Feb. 18, 1958  R. P. SIEG  2,824,074
FLUID ALUMINA-MOLYBDENUM OXIDE REFORMING CATALYST
Filed May 18, 1953
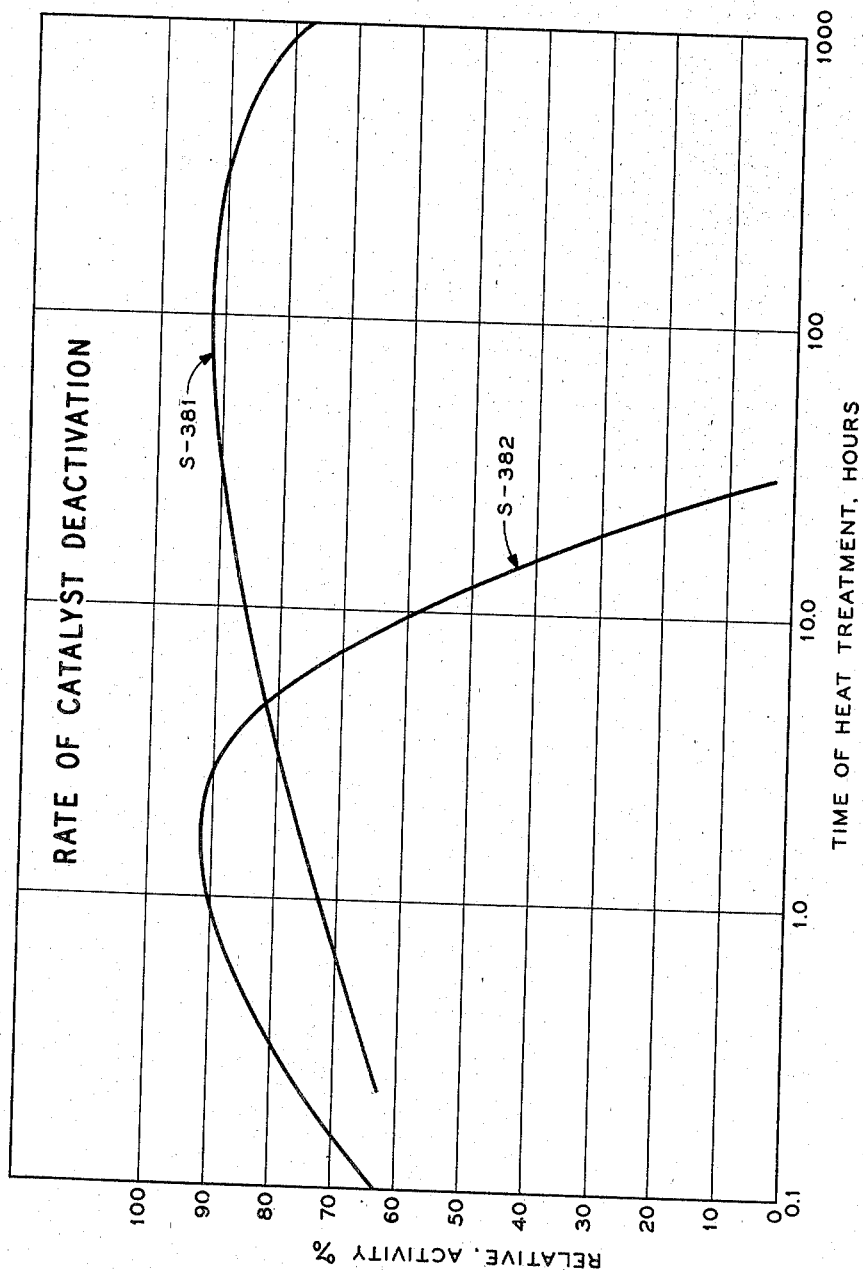
INVENTOR
ROBERT P. SIEG
BY
ATTORNEYS

United States Patent Office 2,824,074
Patented Feb. 18, 1958

2,824,074

FLUID ALUMINA-MOLYBDENUM OXIDE REFORMING CATALYST

Robert P. Sieg, Berkeley, Calif., assignor to California Research Corporation, San Francisco, Calif., a corporation of Delaware Application May 18, 1953, Serial No. 355,576

4 Claims. (Cl. 252—447)

This invention relates to the catalytic reforming of hydrocarbon distillates, and more particularly to the composition, and method of preparation, of a fluidized alumina-molybdenum oxide type reforming catalyst, useful in reforming processes for improving the anti-knock properties of gasoline, and converting low boiling petroleum fractions to aromatics.

Preparations of catalyst compositions of the class or type of aluminum and molybdenum oxides, and reforming processes utilizing such compositions have previously been described. Illustrative of the prior art is Claussen and Wellman U. S. Patent No. 2,481,824. According to this patent, there is provided an improved process for the treatment of low boiling hydrocarbons with an improved catalyst of the alumina-molybdenum oxide type wherein a compound of molybdenum is coprecipitated with a compound of aluminum. The resulting precipitate is then further treated to produce a highly durable catalyst, that is, one having great catalytic activity and long active life.

Further in accordance with the aforesaid patent, following the recovery of the coprecipitate and the washing thereof, the coprecipitate is dried and ground to a powder, and then formed into pellets varying from about 0.1 to 0.75 inch in their longest dimension. It is also stated that preparatory to pelleting of the catalyst powder there is added a lubricant thereto, such as powdered graphite, stearic acid, bentonite, rosin or a saturated high boiling hydrocarbon oil, the finished pelleted catalyst containing graphite being superior in that it has a higher activity for a longer period of time.

More recently, as shown, for example, in Petroleum Refiner 31, No. 5, 114–16 (1952), it has been proposed to apply the fluidized catalyst technique to reforming. In such technique, the reforming catalyst is employed in a finely divided form, so that the fluid catalyst mass can circulate through the system in a turbulent state, and can be moved from zone to zone, such as from reaction zone to regeneration zone, by suspension in gas or vapor. Catalyst particles such that all pass through a 1100 mesh screen and of which not more than about 5% are smaller than 20 microns have been proposed for fluid reforming.

Broadly, the present invention is predicated on the discovery that a superior fluid reforming catalyst of the molybdenum and aluminum oxide type can be prepared provided that powdered graphite is incorporated in said fluid catalyst during the precipitation of the aluminum component, with subsequent impregnation of the molybdenum component, or during the coprecipitation of the molybdenum and aluminum components from aqueous solutions containing soluble compounds of these two elements. That a superior catalyst can result from such procedure is unpredictable, in that the graphite is seen to be uniformly distributed throughout the catalyst mass, although it would be expected that the graphite having a different density from that of the precipitating hydroxides would tend to separate to a distinct phase, as by settling or agglomeration. Moreover, it has been found that while the graphite would be expected to form in granular layers, thus weakening the bonds between the crystallite oxides, the mechanical strength as evidenced by low attrition loss is unexpectedly great, the graphite remaining uniformly distributed throughout the catalyst particle and remaining firmly bound up therewith and occluded therein. These considerations do not apply to the pelleted type catalyst, since such catalyst is formed by the mixing of the graphite with preformed powdered catalyst, any difference in gravity being overcome by the force of mixing, and the graphite being contained or retained by the forces holding the pellet together. As hereinabove indicated, the graphite must be present during the precipitation of the aluminum-containing component or the coprecipitation of the aluminum and molybdenum-containing components, since as hereinbelow to be more fully described, addition of graphite to preformed fluid catalyst fails to give the improved results. In carrying out the invention, an amount, by weight, based on the finished composition, of graphite ranging from about 0.5 to 15%, preferably 2 to 5%, and having an average particle size smaller than that of the catalyst particles, that is, of a size not exceeding about 50 microns, and, preferably, smaller than 10 microns, is satisfactory.

An even superior catalyst material, that is, one having even greater catalytic activity, is obtained if in addition to the presence of graphite during the precipitation or coprecipitation step, a high molecular weight, water-dispersible organic material, such as glue, is also present and is incorporated in the catalyst during the precipitation of the hydrous aluminum oxide or coprecipitation of the hydrous aluminum-molybdenum oxides. This material is incorporated into the catalyst by predispersing it in either or both solutions prior to mixing or may be introduced during the coprecipitation step as a separate stream. In addition to glue, other materials that can be used are animal and vegetable proteins, cellulosic materials and derivatives therefrom, high molecular weight carbohydrates, alcohols, and esters, as well as certain natural and synthetic aqueous emulsions or colloids, such as the rubber latices, microscopic living organisms, bacteria, molds, etc. These materials have molecular weights ranging from about $1 \times 10^3$ to $1 \times 10^7$, those having a molecular weight ranging from about $1 \times 10^4$ to $1 \times 10^6$ being preferred. Also, the organic additive is used in amounts of about 3 to 30%, by weight, based on anhydrous oxide content of the catalyst, and in such concentrations in solution as to be incapable of itself setting up into a gel during the precipitation of the inorganic hydrogel. In carrying out the invention, the preferred amount of organic additive is between about 5–15% by weight of the anhydrous oxide content of the catalyst, while the organic additive is one of the type defined having a molecular weight of about 10,000 to 1,000,000, and is preferably an animal protein, such as gelatin and glue.

As a source of the aluminum component, aluminum chloride, either anhydrous or hydrated, aluminum sulfate or aluminum nitrate can be used with about equal results. Taking aluminum chloride as typical, a solution containing about 6% $AlCl_3$ by weight or approximately 0.52 pound per gallon is particularly suited, though solutions containing from about 0.05 to about 3.0 pounds per gallon may be found suited to certain special conditions. The molybdenum component of the coprecipitated catalyst can be supplied from a solution of ammonium molybdate, $(NH_4)_2MoO_4$; ammonium dimolybdate, $(NH_4)_2Mo_2O_7$; or ammonium heptamolybdate, $$(NH_4)_6Mo_7O_{24}$$

as may be most convenient. If these ammonium salts are not available as such, an entirely satisfactory solution for use in preparing the catalysts can be easily had by dissolving either molybdic acid or molybdic anhydride in the appropriate quantity of aqueous ammonia. When the heptamolybdate is employed most satisfactory results are obtained at about 1.6 pounds per gallon of solution, though solutions ranging from about 0.2 to 8.0 pounds per gallon can sometimes be employed.

Precipitation of the crude catalyst material containing graphite can be effected by bringing together the aluminum- and molybdenum-containing solutions and graphite simultaneously therewith in the proportions to give the desired percentage of the various ingredients desired in the catalyst, and adding to the mixture a solution of aqueous ammonia until precipitation is complete. The reverse order of addition can also be employed. Another satisfactory procedure is first to mix the ammonia and molybdenum salt solutions and then to add this mixture to the aluminum chloride solution or to add the aluminum chloride solution to the mixture, any one or all of the solutions prior to mixing containing the powdered graphite in an amount calculated to give the desired amount in the finished catalyst. When employing the solutions above described at the preferred concentrations, an ammonia solution containing about 10 to 15% ammonia is particularly suited to effect the precipitation, though with other strengths of salt solutions either weaker or stronger ammonia may be preferable.

It is desirable that the concentration of any alkali metal component, particularly of a sodium component, be held at a minimum in the alumina precipitate or the molybdenum-aluminum coprecipitate. Best results are obtained by keeping the sodium content, expressed as metal, below about 0.1% and preferably below 0.05% by weight of the catalyst. While this desired low sodium content may possibly be secured when precipitation is from an alkaline solution, such as the customary solution of sodium aluminate, if resort is had to long and thorough washing of the precipitate, such procedure is not only troublesome, time-consuming and expensive, but also inefficient in that substantial quantities of the molybdenum component will also be washed away. Precipitation from an acid solution of the appropriate salts, utilizing ammonia as the sole alkaline reagent as already described, thus not only results in a more rapid and more convenient, but also in a more economical process, and a particularly active catalyst.

The precipitate containing graphite, thus carefully prepared, and especially when the less concentrated solutions of the reacting salts are used, is a thoroughly homogeneous flocculent mass of hydrous gel which is readily broken up by vigorous stirring and which can be concentrated and collected for further processing by filtration, centrifuging or settling. The best evidence available from X-ray studies of the washed and calcined precipitate indicates the material to consist of a dispersed gamma alumina phase and no evidence of a molybdenum oxide phase is observed with the coprecipitated type catalysts due to its uniform dispersion in the gamma alumina. With the preferred catalysts of this invention, that is, those in which the molybdenum and aluminum oxides are coprecipitated in the presence of graphite, no molybdic oxide as such is to be found in the product, which is believed to be one of the fundamental reasons for the desirable characteristics of the preparation. By reference herein to the catalysts as "coprecipitated" molybdenum-aluminum compositions, it is intended to comprehend the material produced according to the method specifically set forth or its reasonable equivalent irrespective of whether it is merely a mixture of separate compounds of the two elements, a solution of the one oxide in the other or whether a definite compound can be shown to exist between them.

After precipitation is complete and the pH is adjusted to about 8.0, subsequent handling is very much facilitated if the suspension is permitted to stand for a period of several hours in order to permit the finer particles to coagulate. The solid may then readily be collected by either filtration or decantation methods as usually employed. When decantation is used, from two to as many as five or six washings may be necessary in order that the ammonium chloride or other soluble salt content of the finally dried product will be sufficiently low to give the most serviceable material. The same result may be effected by filtration separation if the filter cake is redispersed in pure water and recollected several times. Whichever method is employed, the washing is continued to such extent that the product when substantially dried will contain less than about 10% of ammonium salt.

Following washing, the catalyst cake may be dried and calcined in a number of methods to yield an activated catalyst material having a particle size distribution and attrition resistance suitable for use in fluid reforming. A preferred commercial method involves spray drying, whereby to produce catalyst material in microspheroidal form of the desired particle size. This is accomplished by injecting the catalyst slurry into a stream of hot gases such that the catalyst particles, suspended in this stream, assume a spherical shape and dry sufficiently to form a rigid solid structure before being collected as a bulk solids material. The catalyst so dried may also be activated or calcined in the same operation or may be calcined separately, as in a conventional rotary type calciner. The calcining or activation treatment requires heating the catalyst material for 2 to 6 hours at 900 to 1200° F. in air, flue gas or other suitable atmosphere, to completely dehydrate the catalyst hydrous oxides and to remove by sublimation or decomposition the small residue of volatile inorganic salts not removed during washing. In the case of the alumina base catalytic materials in which the molybdenum was not present during the precipitation step, the molybdenum component may be introduced prior to spray drying by dissolving or dispersing it in the catalyst slurry feed to the spray drier, or the dried microspheres may be wet or impregnated with a solution of the molybdenum compound having a concentration such that the finished calcined catalyst will have the desired composition, preferably 5 to 15%, by weight, based on finished composition, of molybdenum trioxide, the remainder being alumina and graphite.

Another method of drying, sizing and activating, involves fixed bed tray drying of the catalyst filter cake at temperatures of about 200 to 300° F., followed by grinding, and sizing by the use of screens or air classification to obtain a fraction of the catalyst material having the desired particle size range for fluid processing, and then calcining or activating this sized fraction in the same manner as described above.

Caution should be exercised in the calcining or activation step to forestall conditions under which the contained graphite could be lost through combustion. Contained graphite is quite resistant to air oxidation at normal activating or calcining conditions, it being lost by combustion only very slowly at temperatures of 1150–1200° F. in pure air. Thus, reduction of the oxygen partial pressure during calcining or use of somewhat lower temperatures will insure against loss of graphite. The organic additives of the type previously mentioned in the production of a superior and more active form of catalyst are, on the other hand, very readily decomposed and removed by combustion during the calcining step. Decomposition and removal by combustion of the organic additive can readily be accomplished by calcining in air at 900 to 1000° F. Removal of the additive at this stage in the processing is desired in order to produce a more porous and more active form of catalytic material.

Similarly, during use of the catalyst, care is taken that the incorporated graphite is not lost by combustion in the regeneration of the catalyst. Regeneration with 1 to 2% of oxygen in the regeneration gas at temperatures of 900 to 1000° F. will insure against loss of graphite.

Following the procedure above outlined and that of

U. S. Patent No. 2,481,824, which patent to the extent pertinent is hereby incorporated by reference, catalyst compositions were prepared as follows:

(a) 16 g. of 325 mesh graphite was suspended in 2,250 cc. of water (Solution 1);

(b) To 3.750 cc. of a water solution of ammonium molybdate, equivalent to about 10 g. $MoO_3$ per liter, there was added 150 cc. concentrated ammonium hydroxide and 500 cc. of a glue solution containing 33 g. of hide glue (Solution 2);

(c) 1,500 cc. of water was added to 2,475 cc. of an aluminum chloride solution containing the equivalent of 150 g. of aluminum oxide per liter (Solution 3).

The graphite suspension (Solution 1) was adjusted to a pH of 9 by addition of some of the molybdate-containing solution (Solution 2). Solution 2, and the aluminum chloride solution (Solution 3), were added to the graphite suspension with good stirring and at rates approximately proportional to their total volumes to maintain the pH of the mixture at 9 and effect precipitation. After addition of all of Solution 2, the pH of the mixture was adjusted to 6.8 by addition of the remaining Solution 3. The resulting precipitate was filtered and washed twice with 6 liters of water, and the resulting graphite-containing material identified as S-381. Material S-382, graphite-free, was prepared in exactly the same manner except that no graphite was employed in the coprecipitation step. Both samples, S-381 and S-382, were dried at 270° F. in an oven overnight and calcined in air at 1150° F. for three hours. On breaking up of the dried cakes, hard, glassy, uniform appearing granules about 4-6 mesh were formed.

Reference is now made to the attached drawing, wherein rates of catalyst deactivation of catalyst materials S-381 and S-382 are compared.

Referring to the drawing, a series of experiments were carried out by which the variation of activity with time of heat treatment at 1600° F. in a nitrogen atmosphere was determined, the data being presented in graphic form. In the graph, relative activity is plotted against time of heat treatment in hours on a logarithm scale, the activity in question being a relative activity measured by the amount of aromatics produced from a standard feed stock under standard conditions and compared with a standard catalyst sample, which was a 9% molybdenum trioxide hydroformer catalyst. It is seen that operation at a high relative activity is greatly prolonged by virtue of the presence of the graphite. Thus, with the S-381 catalyst the period of useful operation is over 100-fold greater than that of the S-382 catalyst, containing no graphite.

The mechanical properties of the catalyst-containing coprecipitated graphite S-381 were compared with the non-graphite-containing sample S-382 in the following experiments. The samples were ground with two grinder settings, medium and fine, and then subjected to screen analysis with the results as shown below:

S-381 (4% coprecipitated graphite)

| Mesh | Medium | Fine |
|---|---|---|
| On 100 |  |  |
| 100-200 | 81.8 | 61.2 |
| 200-325 | 9.0 | 21.5 |
| -325 | 3.0 | 6.7 |
|  | 6.2 | 10.6 |

S-382 (no graphite)

| Mesh | Medium | Fine |
|---|---|---|
| On 100 |  |  |
| 100-200 | 60.5 | 31.2 |
| 200-325 | 20.9 | 39.6 |
| -325 | 7.7 | 11.4 |
|  | 10.9 | 17.8 |

It will be noted that the graphite-containing catalyst is harder than the other sample, since it shows a larger proportion of material on the 100 mesh screen.

Portions of S-381 and S-382 were ground, screened, and adjusted to prepare a catalyst suitable for fluid operation. Typical requirements for such catalyst are that it all pass through a 100 mesh screen, and that not more than 10 to 15% of material will pass a 325 mesh screen. The fluid catalyst samples were calcined 4 hours at 1150° F. Standard attrition tests were then performed on the S-381, containing 4% of graphite added during coprecipitation, and on S-382, containing 4% of graphite added to preformed fluid catalyst fraction. These were carried out by the method of W. L. Forsythe, Jr. and W. R. Hertwig (Industrial and Engineering Chemistry, vol. 41, page 1200 (1949)). The method involves subjecting the catalyst to the action of high velocity air jets, the extent of particle breakdown being determined by screen or Roller analyses. Roller analysis was used herein and was carried out according to the method of P. S. Roller and P. V. Roundy, Jr., described in Proceedings of the American Society for Testing Materials, "Symposium on New Methods for Particle Size Determination in the Sub-Sieve Range," (1941).

The results were as follows:

|  | S-381 (Graphite added during precipitation) | S-382 +4% Graphite |
|---|---|---|
| Before Attrition: |  |  |
| 0-10 microns | 1.8 | 1.2 |
| 10-20 microns | 1.2 | 1.9 |
| 20-40 microns | 11.0 | 4.9 |
| 40-80 microns | 46.4 | 38.8 |
| +80 microns | 39.6 | 53.2 |
| After Attrition: |  |  |
| 0-10 microns | 6.0 | 6.6 |
| 10-20 microns | 2.7 | 2.5 |
| 20-40 microns | 14.0 | 9.8 |
| 40-80 microns | 41.7 | 29.9 |
| +80 microns | 35.6 | 51.2 |
| Attrition Loss, Wt. Percent: [1] |  |  |
| Percent gain in $-10\mu$ | 4.3 | 5.5 |
| Percent gain in $-20\mu$ | 5.9 | 6.2 |

[1] Attrition loss is defined as the percentage increase in the $-10$ or $-20$ micron size fraction on standard attrition testing. Hence it is the weight percent of that size fraction after attrition minus the percent before attrition, divided by the weight percent of material larger than that fraction before attrition, all times 100.

Example: Attrition loss S-381 (gain in $-20\mu$) =

$$\frac{8.7-3.0}{97.0} \times 100 = 5.9\%$$

It will be noted that the attrition loss was, if anything, lower for the S-381 catalyst of the present invention, although it would be expected that the presence of the coprecipitated graphite in Sample S-381 would lead to an increased production of the fines in the attrition test, due to the presence of cleavage planes introduced by the graphite.

It was ascertained from these attrition experiments that the various sized fractions from S-381 on air classification were all of a uniform grey color while those from S-382+4% graphite varied from very dark grey for the fine sized fractions to almost white for the larger +80 micron particles.

Analysis of fractions from this attrition testing show:

| Catalyst After Attrition | S-381 | S-382 +4% Graphite |
|---|---|---|
| Roller analysis fraction, wt. percent C: |  |  |
| -10 micron fraction | 6.73 | 11.75 |
| 10-20 micron fraction | 7.89 | 14.92 |
| +80 micron fraction | 1.85 | 0.30 |

It is apparent that although some minor concentration of graphite in the smaller particle size fractions occurred with the S-381 graphite containing catalyst, this was very slight as compared with the 40 to 50-fold concentration of graphite in the small particle size fractions with the mechanical mixture of S-382 with graphite.

In any fluidized reaction system, some degree of particle size classification must inevitably occur and attrition loss of catalyst is normally compensated by selective rejection of the small particle size attrition products through such classification and makeup with fresh larger-sized catalyst. The highly selective loss of graphite to the small particle size fractions in the case of the mechanical mixture would result in high rate of rejection of graphite from the reacting system with the catalyst fines. On the other hand, the catalyst of the present invention, showing a far greater tendency to maintain its original distribution of graphite through all particle size ranges would permit maintaining this graphite in the reacting section and realizing its beneficial stabilizing effects in maintaining high activity during prolonged processing.

The following example is given in further illustration of the practice of the invention.

(a) 24 gms. of −325 mesh powdered graphite was dispersed in 4 liters of water (Solution 1);

(b) 2335 cc. of concentrated ammonium hydroxide was diluted with water to 8 liters volume (Solution 2);

(c) 4000 cc. of an aluminum chloride solution containing the equivalent of 150 gms. of aluminum oxide per liter was diluted to 7500 cc. and 500 cc. of a solution containing 60 gms. of dissolved hide glue was added with stirring (Solution 3).

The graphite suspension was adjusted to a pH of 9 by adding a small amount of Solution 2, then Solution 2 and Solution 3 were introduced at about equivalent rates into the vigorously stirred Solution 1 to maintain a pH of 9 and to bring about precipitation of the hydrous aluminum oxide in the presence of graphite and glue. The resultant thick catalyst slurry at a pH of 9.0 was adjusted to a pH of 7.0 by addition of the last of Solution 3, and was then filtered and the resultant filter cake was reslurried with 15 gallons of water and refiltered three times. The final washed filter cake was dried in a 220° F. oven overnight and then ground in a disk grinder and screened to yield a fluid catalyst fraction all passing through a 100 mesh screen and being retained on a 325 mesh screen. A 260 gram portion of this dried and sized catalyst cake was wet with a solution containing 20 gms. of $MoO_3$ dissolved in 80 cc. of dilute ammonium hydroxide. This wet catalyst powder was then dried and calcined in air at 1150° F. for three hours, yielding 220 gms. of a uniform grey catalyst powder having essentially the same particle size distribution as the 100–325 mesh fraction of the alumina gel. This type catalyst composition is found to be particularly effective in the reforming of petroleum naphthas, giving a high yield of aromatics, a substantial increase in octane number and long useful life in service without substantial loss in activity.

As a further illustrative practice of the invention, a coprecipitated molybdena-alumina catalyst containing 9% of $MoO_3$ and 4% of graphite was tested for reforming of a California straight-run naphtha at two operating temperatures, both in the fresh or calcined state and after a severe heat treatment of six hours at 1475° F. in nitrogen. Operating conditions for these activity test runs were: 1.0 liquid hourly space rate, 200 p. s. i. g. operating pressure, 4.0 hours on stream, 6,000 cu. ft. per bbl. of hydrogen recycle and 925 and 955° F. catalyst temperatures.

The feed stock was a 53.0° API naphtha having an ASTM distillation of:

| | °F. |
|---|---|
| Start | 224 |
| 10% | 232 |
| 20% | 236 |
| 50% | 247 |
| 80% | 270 |
| 90% | 288 |
| End point | 328 |

Results of these activity tests follow.

Catalyst

| | Fresh | | Heat Treated 6 hrs., 1,475° F. | | Feed |
|---|---|---|---|---|---|
| Temperature, °F | 925 | 955 | 925 | 955 | |
| Aniline Point, °F | 70.8 | 58.6 | 66.2 | 51.5 | 116 |
| Percent Aromatics | 32.4 | 38.0 | 34.5 | 41.4 | 11.0 |
| Gravity, °API | 49.6 | 48.8 | 49.3 | 48.4 | 53.0 |
| Yields, wt. percent: | | | | | |
| Coke | 0.21 | 0.15 | 0.26 | 0.28 | |
| Gas | 6.63 | 8.06 | 7.00 | 9.12 | |
| Liquid | 93.16 | 91.79 | 92.74 | 90.60 | |

It may be seen from inspection of these data that this catalyst is effective for accomplishing a substantial dehydrogenation of naphthenes to aromatics with resultant increase in octane number of the naphtha. Further, the protective action of the added graphite is clearly shown by a slight increase in activity after severe heat treatment rather than the expected decrease in activity, which is normally experienced after such accelerated life tests.

Obviously, many modifications and variations of the invention, as hereinbefore set forth, may be made without departing from the spirit and scope thereof, and therefore only such limitations should be imposed as are indicated in the appended claims.

I claim:

1. Fluidizable catalyst particles characterized by greatly enhanced attrition resistance and process life, containing alumina and molybdenum oxide and containing from about 0.5 to 15% by weight of crystalline graphite particles uniformly dispersed throughout each catalyst particle.

2. Fluidizable catalyst particles according to claim 1 in which the graphite particle size does not exceed 50 microns.

3. Fluidizable catalyst particles according to claim 1 in which the size of the catalyst particles is such that substantially all of the catalyst particles will pass a 100 mesh screen not more than about 15% will pass a 325 mesh screen.

4. Fluidizable catalyst particles of greatly enhanced attrition resistance and process life, containing alumina and molybdenum oxide and from about 0.5 to 15% by weight of crystalline graphite having an average particle size not exceeding about 50 $\mu$, said graphite being uniformly dispersed throughout each catalyst particle, said catalyst particles having a size such that substantially all pass a 100 mesh screen and not more than about 15% pass a 325 mesh screen.

References Cited in the file of this patent

UNITED STATES PATENTS

| 2,112,931 | Schulze | Apr. 5, 1938 |
| 2,317,803 | Reeves et al. | Apr. 27, 1943 |
| 2,481,824 | Claussen et al. | Sept. 13, 1949 |
| 2,602,771 | Munday et al. | July 8, 1952 |
| 2,697,066 | Sieg | Dec. 14, 1954 |